United States Patent [19]
Verheyden et al.

[11] 3,817,982

[45] June 18, 1974

[54] 2',3'-UNSATURATED NUCLEOSIDES AND METHOD OF MAKING

[75] Inventors: Julian P. H. Verheyden; John G. Moffatt, both of Los Altos, Calif.

[73] Assignee: Syntex (U.S.A.) Inc., Palo Alto, Calif.

[22] Filed: Dec. 29, 1971

[21] Appl. No.: 213,730

[52] U.S. Cl. ............................ 260/211.5 R, 424/180
[51] Int. Cl. ....................... C07d 51/52, C07d 51/54
[58] Field of Search .............................. 260/211.5 R

[56] References Cited
UNITED STATES PATENTS

| | | | |
|---|---|---|---|
| 3,280,104 | 10/1966 | Moffatt et al. | 260/211.5 R |
| 3,281,410 | 10/1966 | Peter et al. | 260/211.5 R |

OTHER PUBLICATIONS

Wolfrom et al., Advances in Carbohydrate Chemistry and Biochemistry, Vol. 24, 1969, pp. 226–230, Academic Press, N.Y.

*Primary Examiner*—Johnnie R. Brown
*Attorney, Agent, or Firm*—Lawrence S. Squires; Gerard A. Blaufarb; William B. Walker

[57] ABSTRACT

Novel 2',3'-unsaturated nucleosides and 2',3'-dideoxy nucleosides and generic methods of preparing such compounds. The methods are characterized by the step of treating a 2'- or 3'-halonucleoside with chromous ion under reactive conditions. The novel 2',3'-unsaturated nucleosides are useful as intermediates in the preparation of 2',3'-dideoxy nucleosides which in turn have utility as antibiotic, cytotoxic, and antiviral agents. The novel 2',3'-unsaturated nucleosides also possess selective DNA terminating properties selective for a number of viruses, and strains of bacteria, and thus are further useful as antiviral or antibiotic agents for these viruses and strains of bacteria.

29 Claims, No Drawings

2',3'-UNSATURATED NUCLEOSIDES AND METHOD OF MAKING

BACKGROUND OF THE INVENTION

1. Field of the Invention

This invention relates to 2',3'-unsaturated nucleosides and to 2',3'-dideoxy nucleosides and to methods of preparing such nucleosides. In a further aspect, this invention relates to 2',3'-unsaturated pyrimidine nucleosides and 2',3'-dideoxy pyrimidine nucleosides and to methods of preparing such pyrimidine nucleosides. In a still further aspect, this invention relates to 2',3'-unsaturated purine and 2',3'-dideoxy purine nucleosides and to methods of preparing such purine nucleosides.

2. The Prior Art

A limited number of processes for preparing certain specific 2',3'-unsaturated nucleosides (e.g., 1-(2,3-dideoxy-β-D-glyceropent-2-enofuranosyl)-uracil; 1-(2,3-dideoxy-β-D-glycero-pent-2-enofuranosyl)-5-fluorouracil; 1-(2,3-dideoxy-β-D-glycero-pent-2-enofuranosyl)-thymine; 1-(2,3-dideoxy-β-D-glycero-pent-2-enofuranosyl)-cytosine; and 1-(2,3-dideoxy-β-D-glycero-pent-2-enofuranosyl)-adenine have been disclosed by the prior art; note for example, Horowitz et al., Tetrahedron Letters, 38, 2725 (1964); Horowitz et al., J. Org. Chem., 32, 817 (1967); Khwaja et al., J. Med. Chem., 12, 543 (1969); Khwaja et al., J. Med. Chem., 10, 1066 (1967); Horowitz et al., J. Org. Chem. 31, 205 (1966); and McCarthy et al., J. Am. Chem. Soc., 88, 1549 (1966). However, the prior art processes are typically quite sensitive. Further, in many instances the prior art processes are cumbersome and afford relatively low yields and require the use of costly and difficultly obtainable 2'-deoxy nucleoside starting materials. Accordingly, we have discovered a felicitous one-step process using 2' - or 3'-halo-nucleoside starting materials, which affords improved results in terms of higher yields and very rapid reactions and which can be conveniently applied to prepare the 2',3'-unsaturated nucleosides of our invention as well as to the general preparation of 2',3'-unsaturated nucleosides.

SUMMARY

In summary, the compounds of our invention can be represented by the following generic formulas:

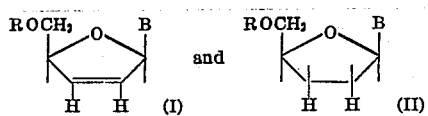

wherein B is a pyrimidine or purine base selected from the limited group described in detail herein below; and R is H, arylalkyl, carboxylic acyl group havine one through 12 carbon atoms, alkyl carbonate in which the alkyl group has from one through 8 carbon atoms, 2,4,4-alkyl or aryl substituted 5-keto dioxolan-2-yl or α-acyloxy-acyl, and pharmaceutically acceptable esters, ethers, and salts thereof.

In summary, the processes of our invention comprise treating a 2'- or 3'-monohalo nucleoside with chromous ion in the presence of a suitable amino complexing agent in a suitable inert solvent. The resulting 2',3'-olefinic nucleoside can then be recovered by any suitable procedure such as, for example, extraction and chromatography. The 2',3'-dideoxy nucleosides are in turn prepared by reduction of the corresponding 2',3'-olefinic nucleosides.

Our invention will be further described herein below.

DETAILED DESCRIPTION OF THE INVENTION AND PREFERRED EMBODIMENTS

The compounds of our invention can be represented by the following formulas:

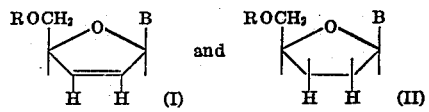

wherein R is hydrogen, arylalkyl, 2,4,4-substituted-5-keto-dioxolan-2-yl, α-acyloxy-acyl, carboxylic acyl group having one through 12 carbon atoms or an alkyl carbonate in which the alkyl group has from one through 8 carbon atoms and B is a pyrimidine base selected from the group represented by the formulas:

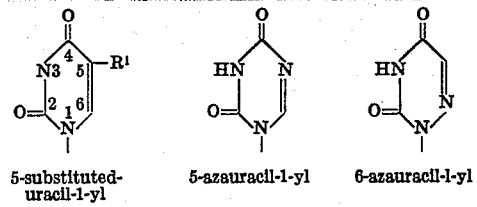

5-substituted-uracil-1-yl    5-azauracil-1-yl    6-azauracil-1-yl

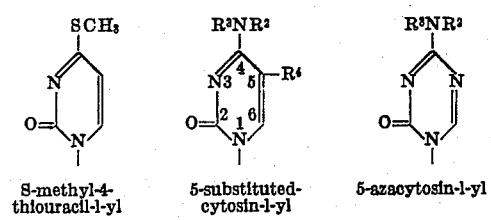

S-methyl-4-thiouracil-1-yl    5-substituted-cytosin-1-yl    6-azacytosin-1-yl

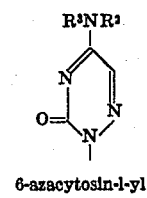

6-azacytosin-1-yl wherein $R^1$ is lower alkylamino, di(lower alkyl) amino; alkyl having 3 through 7 carbon atoms, $R^2$ and $R^3$ are independently hydrogen, lower alkyl, or lower acyl having from 1 through 12 carbon atoms; and $R^4$ is hydrogen, lower alkyl, lower alkylamino, di(lower alkyl)amino, and wherein when $R^2$ and $R^3$ are both hydrogens then $R^4$ cannot be hydrogen, or a purine base selected from the group represented by the formulas:

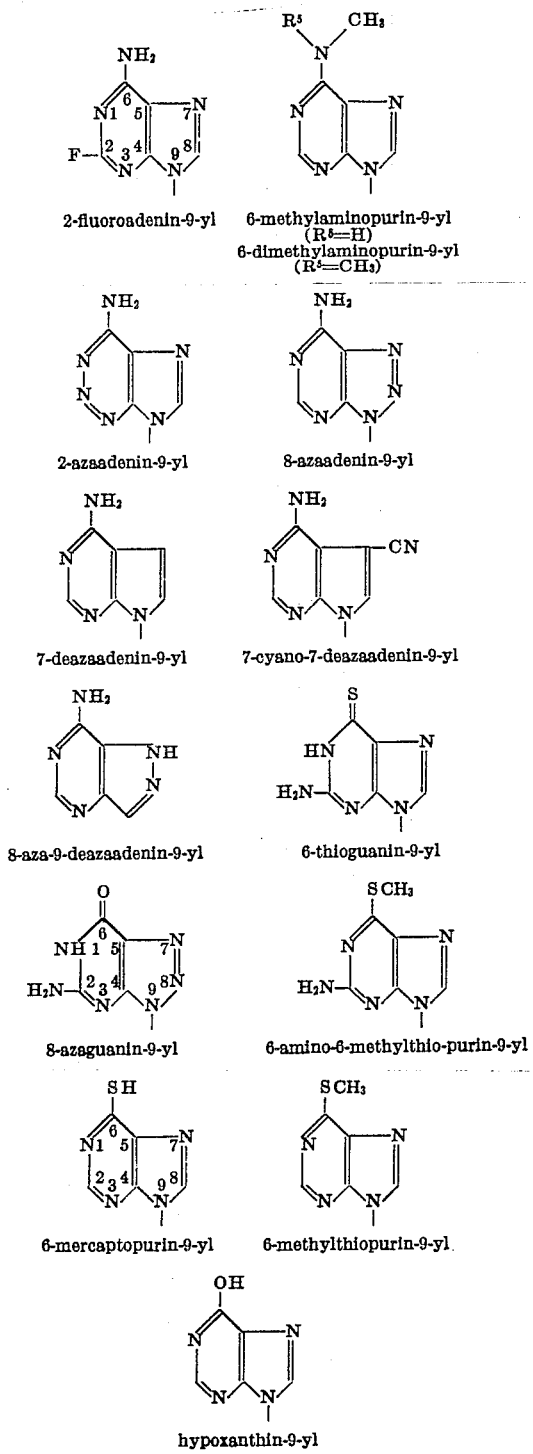

chloro, bromo, iodo, lower alkyl, lower alkoxy, and nitro. Typical aryl groups include, for example, p-chlorophenyl, p-methoxyphenyl, p-nitrophenyl, p-, o-, m-trimethylphenyl, p-chloro-m-fluorophenyl and the like. The term arylalkyl refers to alkyl groups having from one to three phenyl substituents and having from one to eight, and preferably one to four, carbon atoms in the alkyl chain; and having from 7 through 30 carbon atoms. Typical arylalkyl groups included, for example, benzyl, trityl, and the like.

The term 2,4,4-substituted-5-keto-dioxolanyl refers to groups represented by the formula:

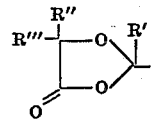

wherein R' is lower alkyl or aryl, R'' and R''' are independently selected from the group consisting of H, aryl, and lower alkyl and wherein when one of R'' and R''' is H the other is aryl. Typical 5-keto-dioxolanyl groups thus include 2-methyl-4,4-diethyl-dioxolan-5-on-2-yl, 2-methyl-4-phenyl-dioxolan-5-on-2-yl; 2,4,4-trimethyl-dioxolan-5-on-2-yl and the like.

The term α-acyloxy-acyl refers to groups represented by the formula:

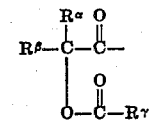

wherein $R^{\alpha}$, $R^{\beta}$ and $R^{\gamma}$ are independently selected from the group consisting of H, aryl, and lower alkyl and wherein when one of $R^{\alpha}$ or $R^{\beta}$ is H the other is aryl. Typical α-acyloxy-acyl groups include, for example, 2-acetoxy-isobutyryl; 2-acetoxy-2-ethylpropionyl; 2-propionyloxy-2-methylpropionyl and the like.

The term hydrolyzable pharmaceutically acceptable ester and ether groups refer to those hydrolyzable ester and ether groups which are conventionally used in the nucleoside-nucleotide art and which do not adversely affect the pharmaceutical properties of the parent compound. Preferably, the ester groups are derived from carboxylic acids having from one to twelve carbon atoms. Typical hydrolyzable ester groups include, for example, acetate, propionate, butyrate, valerate, caproate, enanthate, caprylate, acrylate, undecenoate, phenyloxyacetate, trimethylacetate, cyclohexylacetate, cyclopentylpropionate, adamantoyl, and the like. The term hydrolyzable aryl ether refers to both aryl ether and arylalkyl ether having from 7 through 30 carbon atoms. Typical aryl ether groups include, for example, p-methylphenoxy, trityloxy, benhydryloxy, benzyloxy, and the like. The term pharmaceutically acceptable salts refer to those salts which do not adversely affect the pharmaceutical properties of compounds of formula I such as, for example, are conventionally used in the pharmaceutical art. Typical pharmaceutically acceptable salts thus include, for example, salts of inorganic acids such as, for example, sulfuric, sulfamic, nitric, phosphoric, hydrochloric acids and the like, and salts of organic acids such as, for example, acetic, cit- Also encompassed within our invention are the pharmaceutically acceptable hydrolyzable esters and ethers of the above compounds of formulas I and II - and also pharmaceutically acceptable salts thereof.

Unless expressly stated to the contrary, the following terms, used herein above and below, have the following meanings. The term lower alkyl refers to straight or branched chain alkyl groups containing from one through seven carbon atoms. Typical lower alkyl groups include, for example, methyl, ethyl, isopropyl, sec-butyl, hexyl, and the like. The term aryl refers to phenyl and substituted phenyl having from 1 through 3 substituents wherein said substituents are independently selected from the group consisting of fluoro, ric, lactic, palmitic, tartaric, succinic, maleic, benzoic, sulfonic acids and the like. Typically, attachment of the salt moiety is via the free amino group of the pyrimidine or purine base moiety of the nucleoside. Further, unless expressly stated to the contrary, all temperatures refer to degress Centigrade and the terms room temperature or ambient temperature refers to about 20°C.

Typical pyrimidine nucleosides represented by formula I include, for example,
1-(2,3-dideoxy-β-D-glycero-pent-2-enofuranosyl)-5-methylaminouracil;
1-(5-O-acetyl-2,3-dideoxy-β-D-glycero-pent-2-enofuranosyl)-5-dimethylaminouracil;
1-(5-O-benzyl-2,3-dideoxy-β-D-glycero-pent-2-enofuranosyl)-5-azauracil;
1-(5-O-benzyl-2,3-dideoxy-β-D-glycero-pent-2-enofuranosyl)-6-azauracil;
1-(2,3-dideoxy-β-D-glycero-pent-2-enofuranosyl)-S-methyl-4-thiouracil;
1-(5-O-acetyl-2,3-dideoxy-β-D-glycero-pent-2-enofuranosyl)-5-fluorocytosine;
1-(5-O-benzyl-2,3-dideoxy-β-D-glycero-pent-2-enofuranosyl)-5-trifluoromethylcytosine;
1-(5-O-benzyl-2,3-dideoxy-β-D-glycero-pent-2-enofuranosyl)-5-methylcytosine;
1-(2,3-dideoxy-β-D-glycero-pent-2-enofuranosyl)-5-methylaminocytosine;
1-(5-O-acetyl-2,3-dideoxy-β-D-glycero-pent-2-enofuranosyl)-5-dimethylaminocytosine;
1-(2,3-dideoxy-5-O-trityl-β-D-glycero-pent-2-enofuranosyl)-5-azacytosine;
1-(5-O-benzyl-2,3-dideoxy-β-D-glycero-pent-2-enofuranosyl)-6-azacytosine;
1-(2,3-dideoxy-5-O-[2',4',4'-trimethyldioxolan-5'-on-2'-yl]-β-D-glycero-pent-2-enofuranosyl)-6-azauracil;
1-(2,3-dideoxy-5-O-[2',4',4'-trimethyldioxolan-5'-on-2'-yl]-β-D-glycero-pent-2-enofuranosyl)-S-methyl-4-thiouracil;
1-(2,3-dideoxy-5-O-[2',4',4'-trimethyldioxolan-5'-on-2'-yl]-β-D-glycero-pent-2-enofuranosyl)-5-dimethylaminocytosine;
1-(2,3-dideoxy-5-O-[2',4',4'-trimethyldioxolan-5'-on-2'-yl]-β-D-glycero-pent-2-enofuranosyl)-6-azacytosine;
1-(5-O-[2'-acetoxy-2'-methylpropionyl]-2,3-dideoxy-β-D-glycero-pent-2-enofuranosyl)-6-azauracil;
1-(5-O-[2'-acetoxy-2'-methylpropionyl]-2,3-dideoxy-β-D-glycero-pent-2-enofuranosyl)-S-methyl-4-thiouracil;
1-(5-O-[2'-acetoxy-2'-methylpropionyl]-2,3-dideoxy-β-D-glycero-pent-2-enofuranosyl)-5-dimethylaminocytosine;
1-(5-O-[2'-acetoxy-2'-methylpropionyl]-2,3-dideoxy-β-D-glycero-pent-2-enofuranosyl)-6-azacytosine.

The preferred pyrimidine compounds of formula I of our invention are:
1-(2,3-dideoxy-β-D-glycero-pent-2-enofuranosyl)-5-methylaminouracil;
1-(5-O-acetyl-2,3-dideoxy-β-D-glycero-pent-2-enofuranosyl)-5-dimethylaminouracil;
1-(5-O-benzyl-2,3-dideoxy-β-D-glycero-pent-2-enofuranosyl)-5-azauracil;
1-(5-O-benzyl-2,3-dideoxy-β-D-glycero-pent-2-enofuranosyl)-6-azauracil;
1-(2,3-dideoxy-β-D-glycero-pent-2-enofuranosyl)-S-methyl-4-thiouracil;
1-(5-O-acetyl-2,3-dideoxy-β-D-glycero-pent-2-enofuranosyl)-5-fluorocytosine;
1-(5-O-benzyl-2,3-dideoxy-β-D-glycero-pent-2-enofuranosyl)-5-trifluoromethylcytosine;
1-(5-O-benzyl-2,3-dideoxy-β-D-glycero-pent-2-enofuranosyl)-5-methylcytosine;
1-(2,3-dideoxy-β-D-glycero-pent-2-enofuranosyl)-5-methylaminocytosine;
1-(5-O-acetyl-2,3-dideoxy-β-D-glycero-pent-2-enofuranosyl)-5-dimethylaminocytosine;
1-(2,3-dideoxy-5-O-trityl-β-D-glycero-pent-2-enofuranosyl)-5-azacytosine;
1-(5-O-benzyl-2,3-dideoxy-β-D-glycero-pent-2-enofuranosyl)-6-azacytosine.

Typical purine nucleoside compounds represented by formula I include, for example,
9-(2,3-dideoxy-β-D-glycero-pent-2-enofuranosyl)-2-fluoroadenine;
9-(5-O-acetyl-2,3-dideoxy-β-D-glycero-pent-2-enofuranosyl)-6-methylaminopurine;
9-(2,3-dideoxy-5-O-trityl-β-D-glycero-pent-2-enofuranosyl)-6-dimethylaminopurine;
9-(5-O-benzoyl-2,3-dideoxy-β-D-glycero-pent-2-enofuranosyl)-2-azaadenine;
9-(2,3-dideoxy-β-D-glycero-pent-2-enofuranosyl)-8-azaadenine;
9-(5-O-acetyl-2,3-dideoxy-β-D-glycero-pent-2-enofuranosyl)-7-deazaadenine;
9-(5-O-acetyl-2,3-dideoxy-β-D-glycero-pent-2-enofuranosyl)-8-aza-9-deaza-adenine;
6-cyano-9-(2,3-dideoxy-5-o-trityl-β-D-glycero-pent-2-enofuranosyl)-7-deazaadenine;
9-(5-O-benzoyl-2,3-dideoxy-β-D-glycero-pent-2-enofuranosyl)-S-methyl-6-thioguanine;
9-(2,3-dideoxy-β-D-glycero-pent-2-enofuranosyl)-8-azaguanine;
9-(5-O-acetyl-2,3-dideoxy-β-D-glycero-pent-2-enofuranosyl)-6-mercaptopurine;
9-(2,3-dideoxy-5-O-trityl-β-D-glycero-pent-2-enofuranosyl)-6-methylmercaptopurine;
9-(5-O-benzoyl-2,3-dideoxy-β-D-glycero-pent-2-enofuranosyl)-hypoxanthine;
9-(2,3-dideoxy-5-O-[2',4',4'-trimethyldioxolan-5'-on-2'-yl]-β-D-glycero-pent-2-enofuranosyl)-8-azaadenine;
9-(2,3-dideoxy-5-O-[2',4',4'-trimethyldioxolan-5'-on-2-yl]-β-D-glycero-pent-2-enofuranosyl)-6-mercaptopurine;
9-(2,3-dideoxy-5-O-[2',4',4'-trimethyldioxolan-5'-on-2'-yl]-β-D-glycero-pent-2-enofuranosyl)-2-azaadenine;
9-(2,3-dideoxy-5-O-[2',4',4'-trimethyldioxolan-5'-on-2'-yl]-β-D-glycero-pent-2-enofuranosyl)-2-fluoroadenine;
7-cyano-9-(2,3-dideoxy-5-O-[2',4',4'-trimethyldioxolan-5'-on-2'-yl]-β-D-glycero-pent-2-enofuranosyl)-7-deazaadenine;
9-(5-O-[2'-acetoxy-2'-methylpropionyl]-2,3-dideoxy-β-D-glycero-pent-2-enofuranosyl)-8-azaadenine;
9-(5-O-[2'-acetoxy-2'-methylpropionyl]-2,3-dideoxy-β-D-glycero-pent-2-enofuranosyl)-6-mercaptopurine;

9-(5-O-[2'-acetoxy-2'-methylpropionyl]-2,3-dideoxy-β-D-glycero-pent-2-enofuranosyl)-2-azaadenine;

9-(5-O-[2'-acetoxy-2'-methylpropionyl]-2,3-dideoxy-β-D-glycero-pent-2-enofuranosyl)-2-fluoroadenine;

9-(5-O-[2'-acetoxy-2'-methylpropionyl]-2,3-dideoxy-β-D-glycero-pent-2-enofuranosyl)-7-cyano-7-deazaadenine.

The preferred purine compounds of formula I, of our invention, are:

9-(2,3-dideoxy-β-D-glycero-pent-2-enofuranosyl)-2-fluoroadenine;

9-(5-O-acetyl-2,3-dideoxy-β-D-glycero-pent-2-enofuranosyl)-6-methylaminopurine;

9-(2,3-dideoxy-5-O-trityl-β-D-glycero-pent-2-enofuranosyl)-6-dimethylaminopurine;

9-(5-O-benzoyl-2,3-dideoxy-β-D-glycero-pent-2-enofuranosyl)-2-azaadenine;

9-(2,3-dideoxy-β-D-glycero-pent-2-enofuranosyl)-8-azaadenine;

9-(5-O-acetyl-2,3-dideoxy-β-D-glycero-pent-2-enofuranosyl)-7-deazaadenine;

9-(5-O-acetyl-2,3-dideoxy-β-D-glycero-pent-2-enofuranosyl)-8-aza-9-deaza-adenine;

6-cyano-9-(2,3-dideoxy-5-O-trityl-β-D-glycero-pent-2-enofuranosyl)-7-deazaadenine;

9-(5-O-benzoyl-2,3-dideoxy-β-D-glycero-pent-2-enofuranosyl)-S-methyl-6-thioguanine;

9-(2,3-dideoxy-β-D-glycero-pent-2-enofuranosyl)-8-azaguanine;

9-(5-O-acetyl-2,3-dideoxy-β-D-glycero-pent-2-enofuranosyl)-6-mercaptopurine;

9-(2,3-dideoxy-5-O-trityl-β-D-glycero-pent-2-enofuranosyl)-6-methylmercaptopurine;

9-(5-O-benzoyl-2,3-dideoxy-β-D-glycero-pent-2-enofuranosyl)-hypoxanthine.

Typical nucleosides represented by formula II include, for example, the corresponding 2',3'-dideoxy nucleoside reduction products of the typical nucleosides of formula I set forth herein above.

The preferred pyrimidine nucleosides, of formula II, of our invention, are:

1-(2,3-dideoxy-β-D-glycero-pentofuranosyl)-5-methylaminouracil;

1-(5-O-acetyl-2,3-dideoxy-β-D-glycero-pentofuranosyl)-5-dimethylaminouracil;

1-(5-O-benzyl-2,3-dideoxy-β-D-glycero-pentofuranosyl)-5-azauracil;

1-(5-O-benzyl-2,3-dideoxy-β-D-glycero-pentofuranosyl)-6-azauracil;

1-(2,3-dideoxy-β-D-glycero-pentofuranosyl)-S-methyl-4-thiouracil;

1-(5-O-acetyl-2,3-dideoxy-β-D-glycero-pentofuranosyl)-5-fluorocytosine;

1-(5-O-benzyl-2,3-dideoxy-β-D-glycero-pentofuranosyl)-5-trifluoromethylcytosine;

1-(5-O-benzyl-2,3-dideoxy-β-D-glycero-pentofuranosyl)-5-methylcytosine;

1-(2,3-dideoxy-β-D-glycero-pentofuranosyl)-5-methylaminocytosine;

1-(5-O-acetyl-2,3-dideoxy-β-D-glycero-pentofuranosyl)-5-dimethylaminocytosine;

1-(2,3-dideoxy-5-O-trityl-β-D-glycero-pentofuranosyl)-5-azacytosine;

1-(5-O-benzoyl-2,3-dideoxy-β-D-glycero-pentofuranosyl)-6-azacytosine.

The preferred purine nucleosides, of formula II, of our invention, are:

9-(2,3-dideoxy-β-D-glycero-pentofuranosyl)-2-fluoroadenine;

9-(5-O-acetyl-2,3-dideoxy-β-D-glycero-pentofuranosyl)-6-methylaminopurine;

9-(2,3-dideoxy-5-O-trityl-β-D-glycero-pentofuranosyl)-6-dimethylaminopurine;

9-(5-O-benzoyl-2,3-dideoxy-β-D-glycero-pentofuranosyl)-2-azaadenine;

9-(2,3-dideoxy-β-D-glycero-pentofuranosyl)-8azaadenine;

9-(5-O-acetyl-2,3-dideoxy-β-D-glycero-pentofuranosyl)-7-deazaadenine;

9-(5-O-acetyl-2,3-dideoxy-β-D-glycero-pentofuranosyl)-8-aza-9-deaza-adenine;

6-cyano-9-(2,3-dideoxy-5-O-trityl-β-D-glycero-pentofuranosyl)-7-deazaadenine;

9-(5-O-benzoyl-2,3-dideoxy-β-D-glycero-pentofuranosyl)-S-methyl-6-thioguanine;

9-(2,3-dideoxy-β-D-glycero-pentofuranosyl)-8-azaguanine;

9-(5-O-acetyl-2,3-dideoxy-β-D-glycero-pentofuranosyl)-6-mercaptopurine;

9-(2,3-dideoxy-5-O-trityl-β-D-glycero-pentofuranosyl)-6-methylmercaptopurine;

9-(5-O-benzoyl-2,3-dideoxy-β-D-glycero-pentofuranosyl)-hypoxanthine.

The process, according to our invention, of preparing 2',3'-unsaturated nucleosides, including the 2',3'-unsaturated nucleoside of our invention, can be schematically represented by the following overall reaction equation:

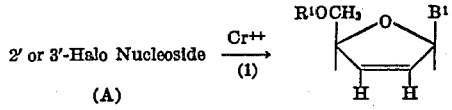

wherein $B^1$ is a pyrimidine or purine base; $R^1$ is H, arylalkyl, 5-keto-2,4,4-substituted-dioxolanyl, α-acyloxyacyl, carboxylic acyl group having from 1 through 12 carbon atoms or an alkyl carbonate in which the alkyl group has from 1 through 8 carbon atoms; and the Halo Nucleoside (formula A) is selected from the group consisting of pyrimidine nucleosides represented by the formulas:

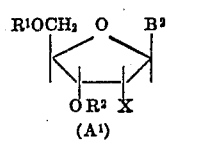 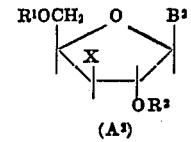

wherein $B^2$ is a pyrimidine base; X is chloro, bromo or iodo; $R^2$ is a conventional hydrolyzable acyl group having from 1 through 12 carbon atoms, and $R^1$ is as defined herein above, and purine nucleosides represented by the formulas:

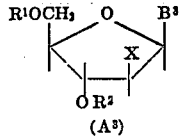 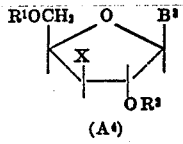

wherein $B^3$ is a purine base and $R^1$, $R^2$ and X are as defined herein above, and mixtures of such 2' and 3'-halo nucleosides having the same base ($B^2$ or $B^3$) component (e.g., 2'-haloribouracil and 3'-haloxylouracil; or 2'-haloarabinoadenine and 3'-haloxyloadenine).

The terms pyrimidine base ($B^2$) and purine base ($B^3$) include both substituted and unsubstituted bases. Typical pyrimidine ($B^2$) and purine ($B^3$) bases include, for example, those set forth above with respect to formulas I and II and also, for example, uracil-1-yl, $N^4$-acetylcytosin-1-yl, $N^4$-benzoyl-cytosin-1-yl, 5-bromouracil-1-yl, $N^4$-acetyl-5-bromocytosin-1yl, $N^4$-benzoyl-5-bromocytosin-1-yl, 5-iodouracil-1-yl, $N^4$-acetyl-5-iodocytosin-1-yl, $N^4$-benzoyl-5-iodocytosin-1-yl, 5-fluorouracil-1-yl, 5-fluoro-$N^4$-acetyl-cytosin-1-yl, 5-fluoro-$N^4$-benzoyl-cytosin-1-yl, thymin-1-yl, $N^4$-acetyl-5-methylcytosin-1-yl, $N^4$-benzoyl-5-methylcytosin-1-yl, 5-trifluoromethyluracil-1-yl, $N^4$-acetyl-5-trifluoromethylcytosin-1-yl, $N^4$-benzoyl-5-trifluoromethylcytosin-1-yl, 5-aminouracil-1-yl, $N^4$-acetyl-5-acetamidocytosin-1-yl, $N^4$-benzoyl-5-acetamidocytosin-1-yl, 5-methylaminouracil-1-yl, $N^4$-acetyl-5-methylaminocytosin-1-yl, $N^4$-benzoyl-5-methylaminocytosin-1-yl, $N^4$-acetyl-6-azacytosin-1-yl, $N^4$-benzoyl-6-azacytosin-1-yl, 6-azathymin-1-yl, hypoxanthin-9-yl, adenin-9-yl, 6-dimethylaminopurin-9-yl, 2-chloroadenin-9-yl, 6-mercaptopurin-9-yl, guanin-9-yl, xanthin-9-yl, 2,6-bis(methylamino)-purin-9-yl, 8-azaadenin-9-yl, 7-deazaadenin-9-yl, and the like.

The above reaction can be effected, according to our invention, be treating the nucleoside compound of formula A with chromous ion, in the presence of a suitable complexing agent, in an inert solvent. The treatment is typically conducted at temperatures in the range of about from 10° to 50°C for about from 1 to 48 hours; however, temperatures and treatment durations both above and below these can also be used. Typically, lower temperatures require longer treatment times. Best results are obtained by using temperatures in the range of about from 10° to 20°C for about from one to 24 hours.

Typically a mole ratio of reactants in the range of about from one to five equivalents of chromous ion per equivalent of halogenated nucleoside is used. However, ratios both above and below these can also be used. Best results are obtained by using mole ratios in the range of about from one to three equivalents of chromous ion per equivalent halogenated nucleoside. The chromous ion is conveniently supplied in the form of a suitable chromium salt. Suitable chromous salts include virtually any chromous salt which is conveniently soluble in a suitable inert solvent and which yields chromous ions upon dissolution, suitable chromium salts thus include, for example, chromous acetate, chromous chloride, chromous sulfate, chromous perchlorate and the like. Suitable inert solvents are those solvents or mixtures of solvents, in which the nucleoside of formula A, the chromous salt, and the complexing agent are appreciably soluble or in which the combination of the nucleoside of formula A with the chromous salt and complexing agent are appreciably soluble and which will not interfere with the desired reaction. Suitable inert solvents include, for example, water, dimethylformamide, ethanol, methyl alcohol, acetonitrile, tetrahydrofuran, and the like. Particularly good results are obtained by using dimethylformamide. Suitable amino complexing agents include, for example, diamines such as, for example, ethylenediamine, propylenediamine, and the like; alkanolamines such as, for example, ethanolamine, propanolamine, and the like; polyalkanolamine such as, for example, diethanolamine, dipropanolamine, triethanolamine, tripropanolamine; alkyldiamines such as, for example, N,N,N',N'-tetramethylethylenediamine, N,N,N',N'-tetraethylethylenediamine, N,N,N'-trimethylethylenediamine, polyamines such as, for example, diethylenetriamine, dipropylenetriamine, and the like; and polyalkylhydroxyaminoalkyls such as, for example, tris(hydroxymethyl)aminomethane, tris(hydroxyethyl)aminoethane, and the like. Preferably about from 1 to 10 equivalents of complexing agent is used per equivalent of chromous ion. We have further found that exceptionally good results (e.g., enhanced yields and/or reaction rates) are obtained by using ethylenediamine or ethanolamine as the complexing agent.

We have also found that exceptionally good results are obtained by using either (1) chromous perchlorate as the source of chromous ion, dimethylformamide as the inert organic solvent, and ethylenediamine or ethanolamine as the complexing agent; or (2) by using chromous acetate, ethanol, and either ethylenediamine or ethanolamine as the complexing agent.

The reagents can, for example, be conveniently contacted by adding a solution of the chromium salt in a suitable inert solvent, containing the chromous ion complexing agent, to a solution of the halonucleoside starting material in a suitable inert solvent. The treatment is preferably conducted under an inert gas such as, for example, nitrogen, helium, argon, and the like. Typically, the same solvent will be used for both the chromium salt and halonucleoside, though different compatible solvents can also be used. Where an excess of chromous ion is used, this excess can be conveniently reduced, thus quenching the reaction by bubbling oxygen through the reaction mixture after the desired reduction of the halonucleoside has taken place. The resulting 2',3'-unsaturated nucleoside product can be separated from the reaction mass by any suitable procedure such as, for example, chromatography or extraction with a suitable solvent (such as, for example, acetone, ethyl acetate, chloroform and the like) which will dissolve the 2',3'-unsaturated nucleoside products but not mineral salts (e.g., chromium salts).

Where cytosine and guanosine starting materials of formula A are used, free amino and other groups, which could interfere with the reaction, should be protected with a suitable protecting group. Suitable protecting groups include, for example, hydrolyzable amides and the like such as are conventionally used in the nucleoside art. Protection of the free amino groups in the cytosine series is necessary to prevent formation of undesired by-products, whereas in the guanine series formation of the N-acyl derivative should be effected to substantially enhance the solubility of the parent free amino guanosine nucleosides. It is also desirable, but not necessary, to similarly protect free amino groups in other nucleoside series, e.g., adenines, and also any easily reducible groups or other groups which could interfere with the chromous ion treatment. The use of protecting groups to protect such groups is well known to the art and any suitable method for effecting the addition of protecting groups can be used. For example, the free amino group of cytosine nucleosides and guanine nucleosides can be protected with an acyl group via treatment with the desired acyl acid anhydride in a suitable inert organic solvent. Details of such procedure can, for example, be obtained from the prior art literature such as, for example, Synthetic Procedures and Nucleic Acid Chemistry, edit. Zorbach and Tipson, Vol. 1, pages 285–287 (1968), and the references cited therein. The acyl group can then be removed, after reduction to the 2′,3′-unsaturated nucleosides, by any suitable procedure; such as are well known to the art. For example, the acyl protecting group can be easily removed by treatment in methanolic ammonia at room temperature. If desired, acyl substitution can also be effected at the 5′-position of the sugar group via any suitable procedure, either before or after the chromous ion treatment. Such substitution can be, for example, similarly effected by treatment of the nucleoside with the desired acyl acid anhydride in a suitable solvent such as, for example, pyridine. The substitution and removal of acyl groups at the 5′-position is conventional and well within the scope of one skilled in the art. Additional details of such procedures can, for example, be obtained from the "Synthetic Procedures in Nucleic Acid Chemistry" text, previously cited, note, for example, pages 200, 245, 321, 353, 359, and 370, and from the references cited therein.

Suitable pyrimidine starting materials of formula A can, for example, be prepared according to the procedure described in U.S. Pat. No. 3,539,550 and Codington et al., J. Org. Chem., v. 29, 558 (1964). We have further found that the procedure described in U.S. Pat. No. 3,539,550 for preparing the 2′-halonucleoside pyrimidines also affords 3′-halonucleoside as a by-product; thus, this process affords a mixture of 2′- and 3′-halonucleosides which can be conveniently used as starting material for the process of our invention either with or without separation of the respective 2′-halo and 3′-halonucleosides.

Suitable purine starting materials of formula A can be prepared by treating the corresponding 9-(β-D-ribofuranosyl) purine nucleoside or 5′-acyl ester thereof, with an α-acyloxy chloride or bromide having the formula:

(B)

wherein X is chloro or bromo; $R^5$ is hydrogen; lower alkyl; or aryl, alkaryl or aralkyl having up to 10 carbon atoms; $R^7$ is hydrogen; lower alkyl; cycloalkyl having from three to 8 carbon atoms; or aryl, alkyl, or aralkyl having up to 10 carbon atoms; and $R^8$ is lower alkyl or aryl, alkaryl, or aralkyl having up to 10 carbon atoms and wherein $R^8$ is aryl, or alkaryl when $R^7$ is hydrogen.

The treatment is conducted with the reagents in an inert organic solvent such as nitromethane, glacial acetic acid, chloroform, ethyl acetate, 1,2-dimethoxyethane, benzene, dimethylformamide, butyrolactone, acetonitrile and the like (preferably dry acetonitrile) at a temperature of about 20° to 150°C, preferably the lower temperatures are used where X=Br, and the higher temperatures used where X=Cl, for a period of 15 minutes to 8 hours or more until the reaction is substantially complete. The resulting product is a mixture of the corresponding 2′- and 3′-halonucleosides, which can be used in the mixture form for starting material (A) or, if desired, can be first separated into the respective 2′-halonucleosides and 3′-halonucleosides via conventional chromatography and then treated separately with chromous ion.

The α-acyloxy chloride or bromide can, for example, be prepared according to the generic procedure described in U.S. Pat. No. 3,539,550.

The process according to our invention of preparing 2′,3′-dideoxy saturated nucleosides comprises reducing the corresponding 2′,3′-dideoxy unsaturated nucleosides:

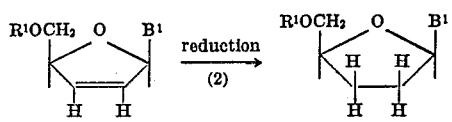

wherein $R^1$ and $B^1$ are as defined herein above.

The reduction can be effected via treatment of the unsaturated nucleoside with diimide reducing agent. This treatment can be conveniently performed by treating the 2′,3′-dideoxy unsaturated nucleoside with a suitable diimide generating agent such as, for example, potassium azodicarboxylate, in a suitable inert organic solvent. Typically the treatment is conducted at temperatures in the range of about from 20° to 40°C for about from 12 to 20 hours. Also typically, a 100 percent stoichiometric excess of diimide generating agent is used. Suitable solvents which can be used include, for example, methanol, ethanol, pyridine, dioxane, and the like. Typically, the diimide generating agent is proton catalyzed to generate the diimide, thus it is preferable that a small amount of acid such as, for example, acetic acid, or other proton-generating agent be present. We have found that best results are obtained using potassium azodicarboxylate with a pyridine solvent containing a small amount of glacial acetic acid.

Alternatively, with the exception of the nucleoside compounds wherein $B^1$ is a 5-chloropyrimidine; 5-bromopyrimidine; 5-iodopyrimidine; 5-alkyl-4-thiopyrimidine; 7-cyanopurine; 6-mercaptopurine or a 6-alkylthiopurine base; the above reduction can be more conveniently effected by catalytic hydrogenation. Catalytic hydrogenation can be conducted by treating the corresponding 2′,3′-dideoxy unsaturated nucleosides (except as noted above) with gaseous hydrogen in a suitable inert organic solvent in the presence of a suitable hydrogenation catalyst. Typically this treatment is conducted at temperatures in the range of about from 10° to 30°C for about from .1 to 24 hours. Suitable inert organic solvents include, for example, methanol, dioxane, tetrahydrofuran, and the like. Suitable catalysts include, for example, palladium impregnated charcoal and palladium impregnated barium sulfate.

The 2′,3′-dideoxy-β-D-glycero-pentofuranosyl nucleosides have been found to be capable of selectively terminating DNA chain in various strains of bacteria and viruses, and thus are useful in the treatment of mammals infected with these organisms. (A discussion of the DNA chain terminating properties of known 2',3'-dideoxy nucleosides with respect to Escherichia coli bacteria can be had by reference to the Journal of Bacteriology, vol. 103, pages 323–328 (1970) and volume 92, pages 565–574 (1966).) The DNA chain terminating properties of these nucleosides also make them especially useful in the treatment of bacteria-contaminated or virus-contaminated instruments, which are subject to contact with organisms which can assimilate the unterminated DNA chain of bacteria and viruses killed by other methods, resulting in the replication of the virus or bacteria by the DNA assimilating organism. The DNA chain terminating properties further renders such nucleosides particularly useful as analytical agents in the study of DNA replication systems, both for control purposes and analysis.

The 2',3'-dideoxy-2'-eno nucleosides are useful as intermediates for the corresponding 2',3'-dideoxy saturated nucleosides and further also possess selective DNA chain terminating properties and thus possess the utilities, discussed above, incident to this property. A discussion of the bacteria and virus-inhibiting properties of 2',3'-dideoxy-2',3'-unsaturated-trifluoromethyluridine and 2',3'-dideoxy-2',3'-unsaturated-5-fluorouridine can, for example, be found in the Journal of Medical Chemistry, Vol. 12, pages 543–545 (1969) and volume 10, pages 1066–1070 (1967), respectively.

A further understanding of the invention can be had from the following nonlimiting examples.

EXAMPLE 1

This example illustrates methods according to our invention of preparing 2',3'-unsaturated uracil nucleosides.

In this example, a solution containing 6.6 g (40 mM.) of 2-acetoxy-2-methylpropionyl chloride in 10 ml. of acetonitrile is added dropwise over a period of about 35 minutes to a suspension containing 2.44 g. (10 mM.) of uridine in 25 ml. of acetonitrile at 80°C with constant stirring. The reaction mixture is then stirred and maintained at 80°C for another 6 hours. The reaction mixture is then evaporated to dryness, and the resulting residue is partitioned between chloroform and aqueous sodium bicarbonate solution. The chloroform layer is then separated, washed with water, dried over sodium sulfate and then evaporated to dryness. The resulting residue is then further purified by dissolution in ethanol, followed by evaporation, to remove any traces of chloroform. The resulting residue, a mixture of 3'-O-acetyl-5'-O-[2''-acetoxy-2''-methylpropionyl]-2'-chloro-2'-deoxyuridine; 1-(2-O-acetyl-5'-O-[2'-acetoxy-2'-methylpropionyl]-3-chloro-3-deoxy-β-D-xylofuranosyl) uracil; 3'-O-acetyl-5'-O-[2'',4'',4''-trimethyl-dioxolan-5''-on-2''-yl]-2'-chloro-2'-deoxyuridine; and 1-(2-O-acetyl-5-O-[2',4',4'-trimethyldioxolan-5'-on-2'-yl]-3-chloro-3-deoxy-β-D-xylofuranosyl) uracil is then dissolved in 10 ml. of ethanol. Nitrogen is passed through the ethanol solution for 15 minutes to remove any dissolved oxygen. The ethanol nucleo-side-containing solution is added to a solution containing 6.0 ml. (100 mM.) of ethylenediamine and 8.5 g. (50 mM.) of chromous acetate in 85 ml. of deoxygenated ethanol at 0°C. The reaction mixture is stirred for five minutes and then oxygen is passed through it for five minutes. The reaction mixture is then neutralized with 7 ml. of acetic acid and cooled by the addition of ice and water. The reaction mixture is concentrated by evaporation to remove most of the ethanol and then extracted with ethyl acetate. The ethyl acetate phase is separated from the reaction mass, dried over sodium sulfate, and then evaporated to dryness. The residue is then further purified by crystallization using ethyl acetate as the solvent affording a mixture of 5-O-(2'-acetoxy-2'-methylpropionyl) and 5-O-(2',4',4'-trimethyldioxolan-5'-on-2'-yl)-derivatives of 1-(2,3-dideoxy-β-D-glycero-pent-2-enofuranosyl) uracil. The 5-O-(2'-acetoxy-2'-methylpropionyl) and 5-O-(2',4',4'-trimethyl-dioxolan-5'-on- 2'-yl) groups are then removed by adding the residue to a 5 percent (wt.) sodium methoxide in anhydrous methanol at room temperature. The mixture is allowed to stand for 10 hours and then evaporated to dryness affording a residue of crude 1-(2,3-dideoxy-β-D-glycero-pent-2-enofuranosyl) uracil which is then further purified by chromatography over silica gel.

By following the same procedure but preparing and using the corresponding 2'- or 3'-chlorinated uracil nucleoside derivatives as starting material, mixtures of the corresponding 5'-O-[2''-acetoxy-2''-methylpropionyl] and 5'-O-[2'',4'',4''-trimethyldioxolan-5''-on-2''-yl]-2',3'-unsaturated nucleosides are prepared and are then treated as above to prepare the following compounds:

1-(2,3-dideoxy-β-D-glycero-pent-2-enofuranosyl)-5-fluorouracil;

1-(2,3-dideoxy-β-D-glycero-pent-2-enofuranosyl)-5-chlorouracil;

1-(2,3-dideoxy-β-D-glycero-pent-2-enofuranosyl)-5-trifluoromethyluracil;

1-(2,3-dideoxy-β-D-glycero-pent-2-enofuranosyl)-5-methyluracil;

1-(2,3-dideoxy-β-D-glycero-pent-2-enofuranosyl)-5-methylaminouracil;

1-(2,3-dideoxy-β-D-glycero-pent-2-enofuranosyl)-5-dimethylaminouracil;

1-(2,3-dideoxy-β-D-glycero-pent-2-enofuranosyl)-6-azauracil; and 1-(2,3-dideoxy-β-D-glycero-pent-2-enofuranosyl)-5-methyl-4-thiouracil.

The above compounds are also prepared according to the same procedure set forth above, but using a solution containing 9.3 ml. (140 mM.) of ethylenediamine, and 47 mM. of chromous perchlorate in 140 ml. of a 1:1 by volume solution of dimethylformamide and water in place of the chromous acetate-ethanol solution. Also, in this instance, the 2'-chloro and 3'-chloro nucleoside residue starting material for the chromous ion treatment is dissolved in 10 ml. of dimethylformamide instead of ethanol.

EXAMPLE 2

This example illustrates procedures, similar to that described in pages 285–287 of Synthetic Procedures in Nucleic Acid chemistry, for protecting the base free amino group in cytosine nucleosides, with an acyl group.

In this example 500 mg. of benzoic anhydride is added to a refluxing solution containing 535 mg (2.2 mM.) of cytidine in 50 ml. of anhydrous ethanol. The reaction mixture is refluxed for an additional 6 hours, with 500 mg. portions of benzoic anhydride being sequentially added to the reaction mixture at one hour intervals, for a period of 5 hours. At the end of the six hour period, i.e., one hour after the final addition of benzoic anhydride, the reaction mass is cooled. The resulting precipitate is recovered by filtration and washed with ethyl ether. The precipitate is then triturated and evaporated three times with 100 ml. portions of warm ether, and then dried. The dried residue is dissolved in 50 ml. of hot (about 80°C) water. The solution is then allowed to cool to room temperature and kept for three hours. The solution is then crystallized by cooling to 10°C for an additional three hours. The resulting crystals are recovered by filtration and then washed with cold water and dried. The crystals are determined by standard nucleoside analytical procedures to be $N^4$-benzoylcytidine.

By following the same procedures as above but using the corresponding cytosine nucleoside starting materials, the following compounds are also prepared:

$N^4$-benzoyl-5-fluorocytidine; $N^4$-benzoyl-5-trifluoromethylcytidine; $N^4$-benzoyl-5-methylcytidine; $N^4$-benzoyl-5-methylaminocytidine; $N^4$-benzoyl-5-dimethylaminocytidine; $N^4$-benzoyl-6-azacytidine; and $N^4$-benzoyl-5-azacytidine.

The corresponding $N^4$-acetyl compounds are prepared according to the same procedure but using acetic anhydride in place of benzoic anhydride.

EXAMPLE 3

This example illustrates methods according to our invention of preparing 2',3'-unsaturated cytosine nucleosides.

In this example, a solution containing 6.6 g. (40 mM.) of 2-acetoxy-2-methylpropionyl chloride in 10 ml. of acetonitrile is added dropwise over a period of about 35 minutes to a suspension containing 3.47 g. (10 mM.) of $N^4$-benzoylcytidine in 30 ml. of acetonitrile, at 80°C, with constant stirring. The reaction mixture is then stirred and maintained at 80°C for another 6 hours. The reaction mixture is then evaporated to dryness, and the resulting residue is partitioned between chloroform and aqueous sodium bicarbonate solution. The chloroform layer is then separated, washed with water, dried over sodium sulfate and then evaporated to dryness. The resulting residue is then further purified by dissolution in ethanol, followed by evaporation, to remove any traces of chloroform. The resulting residue is a mixture of 3'-O-acetyl-5'-O-[2''-acetoxy-2''-methylpropionyl]-2'-chloro-2'-deoxy-$N^4$-benzoylcytidine; 1-(2-O-acetyl-5'-O-[ 2'-acetoxy-2'-methylpropionyl]-3-chloro-3-deoxy-β-D-xylofuranosyl)-$N^4$-benzoylcytosine; 3'-O-acetyl-5'-O-[2'',4'',4''-trimethyldioxolan-5''-on-2''-yl]-2'-chloro-2'-deoxy-$N^4$-benzoylcytidine; and 1-(2-O-acetyl-5-O-[2',4',4'-trimethyldioxolan-5-on-2-yl]-3-chloro-3-deoxy-β-D-xylofuranosyl)-$N^4$-benzoylcytosine. This residue is dissolved in 12 ml. of ethanol. Nitrogen is then passed through the ethanol solution for 15 minutes to remove any dissolved oxygen. The ethanol nucleoside-containing solution is added to a solution containing 6.7 ml. (100 mM.) of ethylene diamine and 8.5 g. (50 mM.) of chromous acetate in 90 ml. of deoxygenated ethanol at 0°C. The reaction mixture is stirred for five minutes and then oxygen is passed through it for five minutes. The reaction mixture is then neutralized to a pH of about 7 by the addition of acetic acid and cooled by the addition of ice in water. The reaction mixture is concentrated by evaporation to remove most of the ethanol and then extracted with ethyl acetate. The ethyl acetate phase is separated from the reaction mass, dried over sodium sulfate, and then evaporated to dryness. The residue is then further purified by crystallization using ethyl acetate as the solvent and is determined to be a mixture of the 5'-O-[2''-acetoxy-2''-methylpropionyl] and 5'-O-[2''',4''',4'''-trimethyldioxolan-5-on-2-yl] derivatives of 1-(2,3-dideoxy-β-D-glycero-pent-2-enofuranosyl)-$N^4$-benzoylcytosine. The 5'-O-[2''-acetoxy-2''-methylpropionyl]; or dioxolane groups and $N^4$-benzoyl groups are then removed via treatment with methanolic ammonia for 18 hours at 20°C yielding 1-(2,3-dideoxy-β-D-glycero-pent-2-enofuranosyl)-cytosine.

By following the same procedures but using the corresponding $N^4$-benzoylcytosine nucleoside derivatives as starting materials, the following compounds are respectively prepared:

1-(2,3-dideoxy-β-D-glycero-pent-2-enofuranosyl)-5-fluorocytosine;

1-(2,3-dideoxy-β-D-glycero-pent-2-enofuranosyl)-5-azacytosine;

1-(2,3-dideoxy-β-D-glycero-pent-2-enofuranosyl)-5-trifluoromethylcytosine;

1-(2,3-dideoxy-β-D-glycero-pent-2-enofuranosyl)-5-methylcytosine;

1-(2,3-dideoxy-β-D-glycero-pent-2-enofuranosyl)-5-dimethylaminocytosine; and 1-(2,3-dideoxy-β-D-glycero-pent-2-enofuranosyl)-6-azacytosine.

The above compounds are also prepared according to the same procedure set forth above, but using a solution containing 9.3 ml. (140 mM.) of ethylenediamine, and 47 mM. of chromous perchlorate in 140 ml. of a 1:1 by volume solution of dimethylformamide and water in place of the chromous acetate ethanol solution. Also, in this instance, the 2'-chloro and 3'-chloro nucleoside residue starting material for the chromous ion treatment is dissolved in 12 ml. of dimethylformamide instead of ethanol.

EXAMPLE 4

In this example 5 mmoles of 3'-O-acetyl-2'-chloro-2'-deoxy-5'-O-[2'',4'',4''-trimethyldioxolan-5''-on-2''-yl] uridine (isolated by chromatography over silicic acid from the mixture prepared according to Example 1) is dissolved in 10 ml. of ethanol. Nitrogen is passed through the ethanol solution for 15 minutes to remove any dissolved oxygen. The ethanol nucleoside-containing solution is added to a solution containing 6.0 ml. (100 mM.) of ethylenediamine and 8.5 g. (50 mM.) of chromous acetate in 85 ml. of deoxygenated ethanol at 0°C. The reaction mixture is stirred for five minutes and then oxygen is passed through it for five minutes. The reaction mixture is then neutralized to a pH of about 7 by the slow addition of acetic acid and then cooled to about 0°C by the addition of ice and water. The reaction mixture is concentrated by evaporation to remove most of the ethanol and then extracted with ethyl acetate. The ethyl acetate phase is separated from the reaction mass, dried over sodium sulfate, and then evaporated to dryness. The residue is determined to be 1-(2,3-dideoxy-5-O-[2',4',4'-trimethyldioxolan-5'-on-2'-yl]-β-D-glycero-pent-2-enofuranosyl)-uracil.

By following the same procedure as above, respectively, using the corresponding 2'-chlorinated nucleoside derivatives as starting materials, the following compounds are prepared:

1-(2,3-dideoxy-5-O-[2',4', 4'-trimethyldioxolan-5'-on-2'-yl]-β-D-glycero-pent-2-enofuranosyl)-6-azauracil;

1-(2,3-dideoxy-5-O-[2',4', 4'-trimethyldioxolan-5'-on-2'-yl]-β -D-glycero-pent-2-enofuranosyl)-S-methyl-4-thiouracil;

1-(2,3-dideoxy-5-O-[2',4',4'-trimethyldioxolan-5'-on-2'-yl]-β-D-glycero-pent-2-enofuranosyl)-cytosine;

1-(2,3-dideoxy-5-O-[2',4',4'-trimethyldioxolan-5'-on-2'-yl]-β-D-glycero-pent-2-enofuranosyl)-5-dimethylaminocytosine; and 1-(2,3-dideoxy-5-O-[2',4',4'-trimethyldioxolan-5'-on-2'-yl]-β-D-glycero-pent-2-enofuranosyl)-6-azacytosine.

The above compounds are also prepared according to the same procedure but using the corresponding 2'-brominated nucleoside derivative as starting materials.

EXAMPLE 5

This example illustrates methods according to our invention of preparing 2',3'-unsaturated adenosine nucleosides.

In this example a solution containing 6.6 g. (40 mM.) of 2-acetoxy-2-methylpropionyl chloride in 10 ml. of acetonitrile is added dropwise over a period of 15 minutes to a suspension containing 2.67 g. (10 mM.) of adenosine in 25 ml. of dry acetonitrile at 80°C with constant stirring. The reaction mixture is stirred and maintained at 80°C for one hour, then evaporated to dryness. The resulting residue is partitioned between ethyl acetate and aqueous sodium bicarbonate solution. The organic layer is then separated and washed with water, dried over sodium sulfate, and then evaporated to dryness. The residue is then further purified by dissolution in ethanol followed by evaporation, to remove any traces of ethyl acetate. The resulting residue is a mixture of 9-(3-O-acetyl-5-O-[2'-acetoxy-2'-methylpropionyl]-2-chloro-2-deoxy-β-D-arabinofuranosyl)-adenine; 9-(2-O-acetyl-5-O-[2'-acetoxy-2'-methylpropionyl]-3-chloro-3-deoxy-β-D-xylofuranosyl)-adenine; 9-(3-O-acetyl-5-O-[2',4',4'-trimethyldioxolan-5'-on-2'-yl]-2-chloro-2-deoxy-β-D-arabinofuranosyl)-adenine; and 9-(2-O-acetyl-5-O-[2',4',4'-trimethyldioxolan-5'-on-2'-yl]-3-chloro-3-deoxy-β-D-xylofuranosyl)-adenine. The residue is then dissolved in 10 ml. of ethanol and nitrogen is passed through the resulting ethanol solution for 15 minutes to remove any dissolved oxygen. The ethanol nucleoside-containing solution is added to a solution containing 6.7 ml. (100 mM.) of ethylenediamine and 8.5 g. (50 mM.) of chromous acetate in 85 ml. of deoxygenated ethanol at 0°C. The reaction mixture is stirred for five minutes after which oxygen is passed through the solution for five minutes. The reaction mixture is then neutralized to pH 7 with acetic acid and cooled by the addition of ice and water. The reaction mixture is concentrated by evaporation to remove most of the ethanol and is then extracted with ethyl acetate. The ethyl acetate phase is separated from the reaction mixture, dried over sodium sulfate, and then evaporated to dryness. The resulting residue, 9-(2,3-dideoxy-5-O-[2'-acetoxy-2'-methylpropionyl]-β-D-glycero-pent-2-enofuranosyl)-adenine and 9-(2,3-dideoxy-5-O-[2',4',4'-trimethyldioxolan-5'-on-2'-yl]-β-D-glycero-pent-2-enofuranosyl)-adenine, is dissolved in 20 ml. of a 1:1, by volume, mixture of methanol and aqueous ammonium hydroxide and allowed to stand at room temperature (20°C) for 18 hours. The mixture is then evaporated to dryness and the resulting residue purified by preparative thin-layer chromatography. The major U.V. absorbing band is eluted and affords crystalline 9-(2,3-dideoxy-β-D-glycero-pent-2-enofuranosyl)-adenine.

By following the same procedure but preparing and using the corresponding 2'- or 3'-chlorinated adenine nucleosides or analogs thereof as starting material, the mixtures of the corresponding 5'-O-[2''-acetoxy-2''-methylpropionyl] and 5'-O-[2'',4'',4''-trimethyldioxolan-5''-on-2''-yl]-2',3'-unsaturated nucleosides are prepared and then converted, as above, to the following corresponding compounds:

9-(2,3-dideoxy-β-D-glycero-pent-2-enofuranosyl)-2-fluoroadenine;

9-(2,3-dideoxy-β-D-glycero-pent-2-enofuranosyl)-8-azaadenine;

9-(2,3-dideoxy-β-D-glycero-pent-2-enofuranosyl)-7-deazaadenine;

7-cyano-9-(2,3-dideoxy-β-D-glycero-pent-2-enofuranosyl)-7-deazaadenine;

9-(2,3-dideoxy-β-D-glycero-pent-2-enofuranosyl)-2-azaadenine;

9-(2,3-dideoxy-β-D-glycero-pent-2-enofuranosyl)-6-methylaminopurine; and 9-(2,3-dideoxy-β-D-glycero-pent-2-enofuranosyl)-6-dimethylaminopurine.

The above compounds are also prepared according to the procedures set forth above, using a solution containing 9.3 ml. (140 mM.) of ethylenediamine and 47 mM. of chromous acetate and 140 ml. of a 1:1, by volume, solution of dimethylformamide and water in place of the chromous acetate ethanol solution. Also, in this instance, the 2'-chloro and 3'-chloro nucleoside residue starting materials for the chromous ion treatment is dissolved in 10 ml. of dimethylformamide instead of ethanol.

EXAMPLE 6

This example illustrates procedures for protecting the purine base free-amino group in guanine nucleosides, with an acyl group.

In this example 1 mmole of 2',3'-O-isopropylideneguanosine is dissolved in 20 ml. of pyridine and 10 ml. of acetic anhydride. The resulting mixture is heated at 100°C for 5 hours and then evaporated to remove the solvents (e.g., pyridine). The resulting residue is chromatographically purified affording $N^2,O^{5'}$-diacetyl-2',3'-O-isopropylideneguanosine. The isopropylidene group is removed via hydrolysis - via treatment with 90 percent aqueous formic acid at 20°C for 18 hours. The resulting $N^2,O^{5'}$-diacetylguanosine is purified by thin-layer chromatography and isolated as an amorphous solid.

By following the same procedure as above but using the corresponding guanine nucleoside starting materials, the following compounds are respectively prepared:

$N^2,O^{5'}$-diacetyl-8-azaguanosine; $N^2,O^{5'}$-diacetyl-2-amino-6-methylthiopurine; and $N^2,O^{5'}$-diacetyl-S-methylthioguanosine.

EXAMPLE 7

This example illustrates methods according to our invention of preparing 2',3'-unsaturated guanosine nucleosides.

In this example a solution containing 6.6 g. (40 mM.) of 2-chloro-2-methylpropionyl chloride in 10 ml. of acetonitrile is added dropwise over a period of 15 minutes to a suspension containing 3.25 g. (10 mM.) of $N^2,O^{5'}$-diacetylguanosine in 30 ml. of dry acetonitrile at 80°C with constant stirring. The reaction mixture is stirred and maintained at 80°C for two hours, then evaporated to dryness. The resulting residue is partitioned between ethyl acetate and aqueous sodium bicarbonate solution. The ethyl acetate layer is separated and washed with water, dried over sodium sulfate, and then evaporated to dryness. The residue is then further purified by dissolution in ethanol followed by evaporation, to remove any traces of ethyl acetate. The resulting residue is a mixture of 9-(3,5-di-O-acetyl-2-chloro-2-deoxy-$\beta$-D-arabinofuranosyl)-$N^2$-acetylguanine and 9-(2,5-di-O-acetyl-3-chloro-3-deoxy-$\beta$-D-xylofuranosyl)-$N^2$-acetylguanine. The residue is then dissolved in 11 ml. of ethanol and nitrogen is passed through the resulting ethanol solution for 15 minutes to remove any dissolved oxygen. The ethanol nucleoside-containing solution is added to a solution containing 6.7 ml. (100 mM.) of ethylenediamine and 8.5 g. (50 mM.) of chromous acetate in 85 ml. of deoxygenated ethanol at 0°C. The reaction mixture is stirred for five minutes after which oxygen is passed through the solution for five minutes. The reaction mixture is then neutralized to a pH of about 7 by the slow addition of acetic acid and cooled to about 0°C by the addition of ice and water. The reaction mixture is concentrated by evaporation to remove most of the ethanol and is then extracted with ethyl acetate. The ethyl acetate phase is separated from the reaction mixture, dried over sodium sulfate, and then evaporated to dryness. The resulting residue is dissolved in 20 ml. of a 1:1, by volume, mixture of methanol and aqueous ammonia hydroxide and allowed to stand at room temperature (20°C) for 18 hours. The mixture is then evaporated to dryness and the resulting residue purified by preparative thin-layer chromatography. The major U.V. absorbent band is eluted and affords crystalline 9-(2,3-dideoxy-$\beta$-D-glycero-pent-2-enofuranosyl)-guanine.

By following the same procedure but preparing and using the corresponding 2'- or 3'-chlorinated guanosine nucleoside derivatives as starting material, the corresponding 2',3'-unsaturated nucleosides are prepared and converted as above to the following corresponding nucleoside compounds:

9-(2,3-dideoxy-$\beta$-D-glycero-pent-2-enofuranosyl)-8-azaguanine;

9-(2,3-dideoxy-$\beta$-D-glycero-pent-2-enofuranosyl)-2-amino-6-methylthiopurine; and 9-(2,3-dideoxy-$\beta$-D-glycero-pent-2-enofuranosyl)-S-methyl-6-thioguanine.

The above compounds are also prepared according to the procedures set forth above, using a solution containing 9.3 ml. (140 mM.) of ethylenediamine and 47 mM. of chromous chloride and 140 ml. of the 1:1, by volume, solution of dimethylformamide by water in place of the chromous acetate ethanol solution. Also, in this instance, the 2'-chloro and 3'-chloro nucleoside residue starting materials for the chromous ion treatment is dissolved in 10 ml. of dimethylformamide instead of ethanol.

EXAMPLE 8

This example illustrates methods according to our invention of preparing 2',3'-unsaturated purine nucleosides.

In this example a solution containing 6.6 g. (40 mM.) of 2-chloro-2-methylpropionyl chloride in 10 ml. of acetonitrile is added dropwise over a period of 15 minutes to a suspension containing 2.84 g. (10 mM.) of 6-mercapto-9-($\beta$-D-ribofuranosyl)-purine in 25 ml. of dry acetonitrile at 80°C with constant stirring. The reaction mixture is stirred and maintained at 80°C for one hour, then evaporated to dryness. The resulting residue is partitioned between ethyl acetate and an aqueous sodium bicarbonate solution. The ethyl acetate layer is then separated and washed with water, dried over sodium sulfate, and then evaporated to dryness. The residue is then further purified by dissolution in ethanol followed by evaporation, to remove any traces of ethyl acetate. The resulting residue is a mixture of 6-mercapto-9-(3-O-acetyl-5-O-[2'-acetoxy-2'-methylpropionyl]-2-chloro-2-deoxy-$\beta$-D-arabinofuranosyl)-purine; 6-mercapto-9-(2-O-acetyl-5-O-[2'-acetoxy-2'-methylpropionyl]-3-chloro-3-deoxy-$\beta$-D-xylofuranosyl)-purine; 9-(3-O-acetyl-5-O-[2',4',4'-trimethyldioxolan-5'-on-2'-yl]-2-chloro-2-deoxy-$\beta$-D-arabinofuranosyl)-6-mercaptopurine; and 9-(2-O-acetyl-5-O-[2',4',4'-trimethyldioxolan-5'-on-2'-yl]-3-chloro-3-deoxy-$\beta$-D-xylofuranosyl)-6-mercaptopurine. The residue is then dissolved in 10 ml. ethanol and nitrogen is passed through the resulting ethanol solution for 15 minutes to remove any dissolved oxygen. The ethanol nucleoside-containing solution is added to a solution containing 6.7 ml. (100 mM.) of ethylenediamine and 8.5 g. (50 mM.) of chromous acetate in 85 ml. of deoxygenated ethanol at 0°C. The reaction mixture is first stirred for five minutes and then oxygen is passed through the mixture for five minutes. The reaction mixture is neutralized to a pH of about 7 by the slow addition of acetic acid and cooled to about 0°C by the addition of ice and water. The reaction mixture is concentrated by evaporation to remove most of the ethanol and is then extracted with ethyl acetate. The ethyl acetate phase is separated from the reaction mixture, dried over sodium sulfate, and then evaporated to dryness. The resulting residue, 6-mercapto-9-(2,3-dideoxy-5-O-[2'-acetoxy-2'-methylpropionyl] and 5-O-[2',4',4'-trimethyldioxolan-5'-on-2'-yl]-$\beta$-D-glycero-pent-2-enofuranosyl)-purine, is dissolved in 20 ml. of a 1:1, by volume, mixture of methanol and aqueous ammonium hydroxide and allowed to stand at room temperature (20°C) for 18 hours. The mixture is then evaporated to dryness and the resulting residue purified by preparative thin-layer chromatography. The major U.V. absorbent band is eluted and affords crystalline 6-mercapto-9-(2,3-dideoxy-$\beta$-D-glycero-pent-2-enofuranosyl)-purine.

By following the same procedure but preparing and using the corresponding 2'-chlorinated and 3'-chlorinated purine nucleoside derivatives as starting material, 6-methylmercapto-9-(2,3-dideoxy-$\beta$-D-glycero-pent-2-enofuranosyl)-purine is also prepared.

The above compounds are also prepared according to the procedures set forth above, using a solution containing 9.3 ml. (140 mM.) of ethylenediamine and 47 mM. of chromous chloride and 140 ml. of the 1:1, by volume, solution dimethylformamide by water in place of the chromous acetate ethanol solution. Also, in this instance, the 2'-chloro and 3'-chloro nucleoside residue starting materials with the chromous ion treatment is dissolved in 10 ml. of dimethylformamide instead of ethanol.

EXAMPLE 9

This example illustrates methods according to our invention of preparing 2',3'-unsaturated purine nucleosides.

In this example, 5 mmoles of 9-(5-O-[2',4',4'-trimethyldioxolan-5'-on-2'-yl]-2-O-acetyl-3'-chloro-3'-deoxy-β-D-xylofuranosyl)-8-azaadenine, is dissolved in 10 ml. of dimethylformamide. Nitrogen is then passed through the solution for 15 minutes to purge any dissolved or occluded oxygen. The solution is then added to a solution containing 9.3 ml. (140 mM.) of ethylenediamine and 47 mM. of chromous acetate in 140 ml. of a 1:1, by volume, solution of dimethylformamide and water at 20°C. The reaction mixture is stirred for four minutes and then quenched by passing oxygen through the mixture for five minutes. The reaction mixture is concentrated by evaporation to remove most of the ethylenediamine and partitioned between ethyl acetate and water. The resulting ethyl acetate phase is separated from the reaction mixture, dried over sodium sulfate and evaporated to dryness. The residue is dissolved in 100 ml. of a 1:1, by volume, mixture of methanol and aqueous ammonium hydroxide and allowed to stand at 20°C for 4 hours. The mixture is evaporated to dryness and the resulting residue is then further purified by chromatography affording 9-(2,3-dideoxy-β-D-glycero-pent-2-enofuranosyl)-8-azaadenine.

By following the same procedure as above, but using the corresponding 3'-chlorinated nucleoside derivative as starting materials, the following compounds are respectively prepared:

9-(2,3-dideoxy-β-D-glycero-pent-2-enofuranosyl)-7-cyano-7-deazaadenine;

9-(2,3-dideoxy-β-D-glycero-pent-2-enofuranosyl)-6-dimethylaminopurine;

9-(2,3-dideoxy-β-D-glycero-pent-2-enofuranosyl)-2-azaadenine;

9-(2,3-dideoxy-β-D-glycero-pent-2-enofuranosyl)-2-chloroadenine; and 9-(2,3-dideoxy-β-D-glycero-pent-2-enofuranosyl)-2-fluoroadenine.

The above compounds are also prepared according to the same procedure but using the corresponding 2'- or 3'-brominated nucleoside derivatives as starting materials.

EXAMPLE 10

Examples 1, 3, 4, 5, 7, 8, and 9 are repeated but, using 5.9 ml. of ethanolamine as the complexing agent in place of ethylenediamine.

EXAMPLE 11

Examples 1, 3, 5, 7, 8, and 10 (except for the portion of Example 10 related to Examples 4 and 9) are repeated but, using 2-acetoxy-2-methylpropionyl bromide in place of 2-acetoxy-2-methylpropionyl chloride, thereby affording a mixture of 2'-bromo and 3'-bromo nucleosides as the intermediate product. The bromo nucleoside intermediates are then converted to the corresponding 2',3'-unsaturated nucleosides via treatment with chromous ion in the same manner.

EXAMPLE 12

This example illustrates the procedures, similar to that described in pages 441–442 of "Synthetic Procedures in Nucleic Acid Chemistry", for adding 5'-substituents in the compounds of our invention and for preparing the 5'-O-arylalkyl-2',3'-unsaturated nucleoside ethers of our invention.

In this example a mixture of 9.8 g. (41 mM.) of dry, finely divided 1-(2,3-dideoxy-β-D-glycero-pent-2-enofuranosyl)-5-methylaminouracil and 12.6 g. (45 mM.) of pure dry chlorotriphenylmethane is dissolved in 120 ml. of anhydrous redistilled pyridine. The solution is then kept overnight at room temperature (20°C) under anhydrous conditions and then heated under anhydrous conditions at 120°C for one hour. The solution is then cooled and poured into one liter of water with vigorous stirring resulting in the formation of a precipitate. The precipitate is filtered and well washed with water, and is then redissolved in absolute ethyl alchohol and the resulting solution cooled affording crystals of 1-(2,3-dideoxy-5-O-triphenylmethyl-β-D-glycero-pent-2-enofuranosyl)-5-methylaminouracil.

By following the same procedure as above, but using the corresponding 5'-hydroxy-2',3'-unsaturated nucleoside compounds of our invention, the following compounds of our invention are respectively prepared:

1-(2,3-dideoxy-5O-triphenylmethyl-β-D-glycero-pent-2-enofuranosyl)-5-dimethylaminouracil;

1-(2,3-dideoxy-5-O-triphenylmethyl-β-D-glycero-pent-2-enofuranosyl)-5-azauracil;

1-(2,3-dideoxy-5-O-triphenylmethyl-β-D-glycero-pent-2-enofuranosyl)-6-azauracil;

1-(2,3-dideoxy-5-O-triphenylmethyl-β-D-glycero-pent-2-enofuranosyl)-S-methyl-4-thiouracil;

1-(2,3-dideoxy-5-O-triphenylmethyl-β-D-glycero-pent-2-enofuranosyl)-5-fluorocytosine;

1-(2,3-dideoxy-5-O-triphenylmethyl-β-D-glycero-pent-2-enofuranosyl)-5-trifluoromethylcytosine;

1-(2,3-dideoxy-5-O-triphenylmethyl-β-D-glycero-pent-2-enofuranosyl)-5-methylcytosine;

1-(2,3-dideoxy-5-O-triphenylmethyl-β-D-glycero-pent-2-enofuranosyl)-5-methylaminocytosine;

1-(2,3-dideoxy-5-O-triphenylmethyl-β-D-glycero-pent-2-enofuranosyl)-5-dimethylaminocytosine;

1-(2,3-dideoxy-5-O-triphenylmethyl-β-D-glycero-pent-2-enofuranosyl)-5-azacytosine; and 1-(2,3-dideoxy-5-O-triphenylmethyl-β-D-glycero-pent-2-enofuranosyl)-6-azacytosine.

EXAMPLE 13

This example illustrates procedures for converting the 5'-O-triphenylmethyl-2',3'-unsaturated nucleoside compounds of our invention into the corresponding 5'-hydroxy-2',3'-unsaturated nucleoside compounds of our invention.

In this example, 0.25 g. (0.425 mM.) of 1-(2,3-dideoxy-5-O-triphenylmethyl-β-D-glycero-pent-2-enofuranosyl)-5-methyl-aminouracil is swirled with 2.5 ml. formic acid (98–100 percent by weight). The reaction mixture is allowed to stand for five minutes at room temperature (20°C) with constant stirring. The reaction mixture is then vacuum evaporated to remove formic acid, treated for 5 minutes with 5 percent ammonium hydroxide and evaporated to dryness. The resulting residue is then purified by chromatography over silicic acid. The fractions containing 1-(2,3-dideoxy-β-D-glycero-pent-2-enofuranosyl)-5-methylamino-uracil are pooled together and evaporated to dryness. This product is further purified by recrystallization from a mixture of ethanol and ethyl acetate.

By following the above procedure, the remaining compounds prepared according to Example 12, are converted into the corresponding parent 5-hydroxy nucleoside compounds of our invention.

EXAMPLE 14

This example illustrates methods for preparing 2',3'-dideoxy saturated nucleosides from the corresponding 2',3'-unsaturated nucleosides via catalytic hydrogenation.

In this example, 1.2 g. (5 mM.) of 1-(2,3-dideoxy-β-D-glycero-pent-2-enofuranosyl)-5-methylaminouracil are dissolved in 50 ml. of absolute alcohol, containing 0.1 g. of 10 percent palladium impregnated charcoal catalyst, at 25°C. The mixture is maintained at 25°C and shaken under one atmosphere of hydrogen pressure for 60 minutes. The catalyst is then removed by filtration and the resulting filtrate evaporated to dryness. The resulting residue is then purified by thin-layer chromatography affording 1-(2',3'-dideoxy-β-D-glycero-pentofuranosyl)-5-methylaminouracil.

By following the same procedures as above, but using a corresponding 2',3'-unsaturated nucleoside starting material, prepared according to Examples 1, 3, 5, 7, and 8, the following 2',3'-dideoxy nucleosides are respectively prepared:

1-(2,3-dideoxy-β-D-glycero-pentofuranosyl)-5-fluorouracil;
1-(2,3-dideoxy-β-D-glycero-pentofuranosyl)-5-trifluoromethyluracil;
1-(2,3-dideoxy-β-D-glycero-pentofuranosyl)-5-methyluracil;
1-(2,3-dideoxy-β-D-glycero-pentofuranosyl)-uracil;
1-(2,3-dideoxy-β-D-glycero-pentofuranosyl)-5-dimethylaminouracil;
1-(2,3-dideoxy-β-D-glycero-pentofuranosyl)-6-azauracil;
1-(2,3-dideoxy-β-D-glycero-pentofuranosyl)-5-fluorocytosine;
1-(2,3-dideoxy-β-D-glycero-pentofuranosyl)-5-azacytosine;
1-(2,3-dideoxy-β-D-glycero-pentofuranosyl)-cytosine;
1-(2,3-dideoxy-β-D-glycero-pentofuranosyl)-5-trifluoromethylcytosine;
1-(2,3-dideoxy-β-D-glycero-pentofuranosyl)-5-methylcytosine;
1-(2,3-dideoxy-β-D-glycero-pentofuranosyl)-5-methylaminocytosine;
1-(2,3-dideoxy-β-D-glycero-pentofuranosyl)-5-dimethylaminocytosine;
1-(2,3-dideoxy-β-D-glycero-pentofuranosyl)-6-azacytosine;
9-(2,3-dideoxy-β-D-glycero-pentofuranosyl)-adenine;
9-(2,3-dideoxy-β-D-glycero-pentofuranosyl)-2-fluoroadenine;
9-(2,3-dideoxy-β-D-glycero-pentofuranosyl)-8-azaadenine;
9-(2,3-dideoxy-β-D-glycero-pentofuranosyl)-7-deazaadenine;
7-cyano-9-(2,3-dideoxy-β-D-glycero-pentofuranosyl)-7-deazaadenine;
9-(2,3-dideoxy-β-D-glycero-pentofuranosyl)-2-azaadenine;
9-(2,3-dideoxy-β-D-glycero-pentofuranosyl)-6-methylaminopurine;
9-(2,3-dideoxy-β-D-glycero-pentofuranosyl)-6-dimethylaminopurine;
9-(2,3-dideoxy-β-D-glycero-pentofuranosyl)-2-methyladenine;
9-(2,3-dideoxy-β-D-glycero-pentofuranosyl)-guanine; and
9-(2,3-dideoxy-β-D-glycero-pentofuranosyl)-8-azaguanine.

EXAMPLE 15

This example illustrates methods, according to the invention, for preparing 2',3'-dideoxy saturated nucleosides from the corresponding 2',3'-dideoxy-unsaturated nucleosides, via reduction with a diimide reducing agent.

In this example 5.4 g. of glacial acetic acid is added to a stirred mixture containing 9 mmoles of 1-(2,3-dideoxy-β-D-glycero-pent-2-enofuranosyl)-5-chlorouracil and 45 mmoles of potassium azodicarboxylate in 135 ml. of pyridine at room temperature. The resulting mixture is stirred under anhydrous condition, in an inert gaseous nitrogen atmosphere, for 24 hours at room temperature, and then evaporated to dryness. The residue is then partitioned between water (250 ml.) and ethyl acetate (250 ml.). The ethyl acetate phase is separated, dried over magnesium sulfate, filtered and evaporated to dryness yielding a crude residue of 1-(2,3-dideoxy-β-D-glycero-pentofuranosyl)-5-chlorouracil, which is then further purified by column chromatography over silica gel.

Similarly by following the same procedure but using the corresponding 2',3'-dideoxy unsaturated nucleosides as starting materials, the following compounds are respectively prepared:

1-(2,3-dideoxy-β-D-glycero-pentofuranosyl)-S-methyl-4-thiouracil;
9-(2,3-dideoxy-β-D-glycero-pentofuranosyl)-6-mercaptoguanine;
9-(2,3-dideoxy-β-D-glycero-pentofuranosyl)-6-methylthioguanine;
9-(2,3-dideoxy-β-D-glycero-pentofuranosyl)-6-mercaptopurine; and
9-(2,3-dideoxy-β-D-glycero-pentofuranosyl)-6-methylthiopurine.

Obviously many modifications and variations of the invention described herein above and in the claims can be made without departing from the essence and scope thereof.

What is claimed is:

1. A method of preparing 2',3'-unsaturated nucleosides which comprises treating a halogenated nucleoside selected from the group consisting of compounds represented by the formulas:

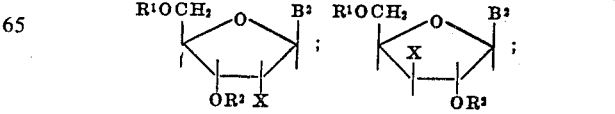

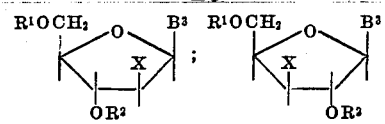

wherein $B^2$ is a pyrimidine base; $B^3$ is a purine base $R^1$ is H, aryl, alkylaryl, 2,4,4-trialkyl-5-keto-dioxolan-2-yl, α-acyloxy-acyl, carboxylic acyl group having one through 12 carbon atoms, or alkylcarbonate wherein the alkyl moiety has from one to eight carbon atoms; $R^2$ is a conventional hydrolyzable acyl group having from 1 through 12 carbon atoms; and X is chloro or bromo; with chromous ion in the presence of an amino complexing agent, which complexes chromous ion, selected from the group consisting of diamines, alkanolamines, polyalkanolamines, alkyldiamines, polyamines, and polyalkylhydroxyaminoalkyls in an inert solvent, under reactive conditions at temperatures in the range of about 0° to 50°C.

2. The process of claim 1 wherein said treatment is conducted at temperatures in the range of about from 10° to 30°C for about from 5 minutes to 48 hours.

3. The process of claim 1 wherein said amino complexing agent is selected from the group consisting of ethylenediamine, propylenediamine, ethanolamine, propanolamine, diethanolamine, dipropanolamine, triethanolamine, tripropanolamine, tripropylamine, N,N,N',N'-tetramethylethylenediamine, N,N,N',N'-tetraethylethylenediamine, N,N,N'-trimethylethylenediamine, diethylenediamine, dipropylenediamine, tris(hydroxymethyl)aminoethanol, and tris(hydroxyethyl)aminoethane.

4. The process of claim 3 wherein said amino complexing agent is selected from the group consisting of ethylenediamine and ethanolamine.

5. The process of claim 1 wherein said chromous ion is supplied by a chromous salt selected from the group consisting of chromous acetate, chromous chloride, chromous sulfate, chromous perchlorate, and mixtures thereof.

6. The process of claim 1 wherein said inert solvent is selected from the group consisting of dimethylformamide, ethanol, methanol, acetonitrile, tetrahydrofuran, and water.

7. The process of claim 6 wherein said inert solvent is selected from the group consisting of dimethylformamide and ethanol.

8. The process of claim 5 wherein said chromous salt is chromous perchlorate, said inert organic solvent is dimethylformamide and said complexing agent is selected from the group consisting of ethylenediamine and ethanolamine.

9. The process of claim 5 wherein said chromous salt is chromous acetate, said inert organic solvent is ethanol and wherein said complexing agent is selected from the group consisting of ethylenediamine and ethanolamine.

10. The process of claim 8 wherein said treatment is conducted at temperatures in the range of about from 10 to 30°C for about from 5 minutes to 48 hours.

11. The process of claim 9 wherein said treatment is conducted at temperatures in the range of about from 10 to 30°C for about from 5 minutes to 48 hours.

12. The process of claim 1 wherein a reactant ratio in the range of about from one to five equivalents of chromous ion per equivalent of halonucleoside is used.

13. The process of claim 12 wherein about from 1 to 10 equivalents of amino complexing agent is used per equivalent of chromous ion.

14. A method of preparing 2',3'-dideoxy-β-D-glycero-pentofuranosyl nucleosides which comprises the steps of:

a. treating a halogenated nucleoside selected from the group consisting of nucleoside compounds represented by the formulas:

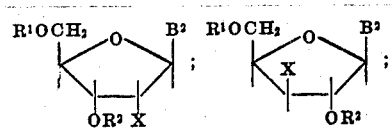

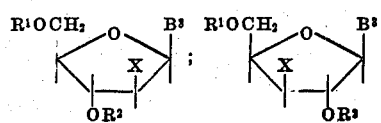

wherein $B^2$ is a pyrimidine base; $B^3$ is a purine base; $R^1$ is H, aryl, alkylaryl, 2,4,4-trialkyl-5-keto-dioxolan-2-yl, α-acyloxy-acyl, carboxylic acyl group having one through 12 carbon atoms, or alkylcarbonate wherein the alkyl moiety has from one to eight carbon atoms; $R^2$ is a conventional hydrolyzable acyl group having from 1 through 12 carbon atoms; and X is chloro or bromo; with chromous ion in the presence of an amino complexing agent, which complexes chromous ion, selected from the group consisting of diamines, alkanolamines, polyalkanolamines, alkyldiamines, polyamines, and polyalkylhydroxyaminoalkyls in an inert solvent, under reactive conditions at temperatures in the range of about from 0° to 50°C thereby yielding the corresponding 2',3'-unsaturanted nucleoside product; and b. reducing the product of step a) thereby yielding the corresponding 2',3'-dideoxy-β-D-glycero-pentofuranosyl nucleoside.

15. The process of claim 14 wherein step b) is effected by treating the product of step a) with a diimide reducing agent in an inert organic solvent under reactive conditions.

16. The process of claim 15 wherein said diimide reducing agent is generated in situ from potassium azodicarboxylate.

17. The process of claim 14, wherein $B^2$ is a pyrimidine base other than 5-chloropyrimidine; 5-bromopyrimidine; 5-iodopyrimidine; and S-alkyl-4-thiopyrimidine; and $B^3$ is a purine base other than 7-cyanopurine; 6-mercaptopurine and 6-alkylthiopurine, and wherein said step (b) is effected by catalytic hydrogenation.

18. The process of claim 14 wherein said inert organic solvent is dimethylformamide and said complexing agent is selected from the group consisting of ethylenediamine and ethanolamine, and wherein said chromous ion is supplied by chromous perchlorate.

19. The process of claim 14 wherein said inert organic solvent is ethanol and wherein said complexing agent is selected from the group consisting of ethylenediamine and ethanolamine, and wherein said chromous ion is supplied by chromous acetate.

20. A compound selected from the group having the formulas:

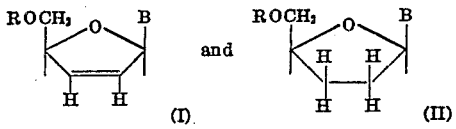

wherein R is hydrogen; arylalkyl having 7 through 30 carbon atoms; 2,4,4-substituted-5-keto-dioxolan-2-yl having the formula:

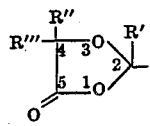

wherein R' is lower alkyl or aryl, R'' and R''' are independently selected from the group consisting of H, aryl, and lower alkyl and wherein when one of R'' and R''' is H the other is aryl having from 7 through 9 carbon atoms;
α-acyloxy-acyl having the formula:

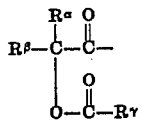

wherein $R^\alpha$, $R^\beta$ and $R^\gamma$ are independently selected from the group consisting of H, aryl, and lower alkyl and wherein when one of $R^\alpha$ and $R^\beta$ is H the other is aryl;
carboxylic acyl group having one through 12 carbon atoms or an alkyl carbonate in which the alkyl group has from one through 8 carbon atoms; and
B is a purine base selected from the group consisting of 2-fluoroadenin-9-yl, 6-methylaminopurin-9-yl, 6-dimethylaminopurin-9-yl, 2-azaadenin-9-yl, 8-azaadenin-9-yl, 6-deazaadenin-9-yl, 7-cyano-7-deazaadenin-9-yl, 8-aza-9-deazaadenin-9-yl, 6-thioguanin-9-yl, 8-azaguanin-9-yl, 2-amino-6-methylthiopurin-9-yl, 6-mercaptopurin-9-yl, 6-methylthiopurin-9-yl, and hypoxanthin-9-yl;
or B is a pyrimidine base selected from the group represented by the formulas:

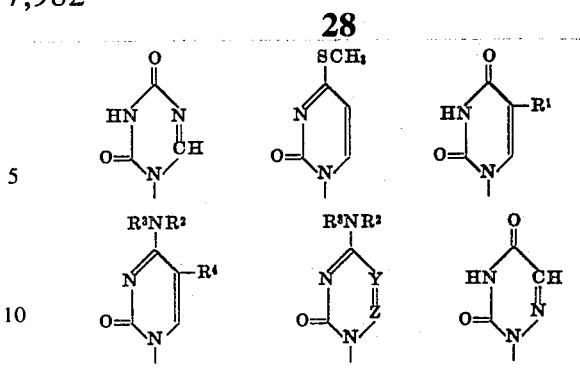

wherein one of Y or Z is nitrogen and the other is carbon; $R^1$ is lower alkylamino, di(lower alkyl)amino or alkyl having 3 through 7 carbon atoms; and $R^2$ and $R^3$ are independently hydrogen, lower alkyl, or lower acyl having from 1 through 12 carbon atoms; and $R^4$ is hydrogen, lower alkyl, lower alkylamino, or di(lower alkyl)amino, wherein when $R^2$ and $R^3$ are both hydrogens then $R^4$ cannot be hydrogen;
and wherein when said compound has the formula II then B can only be 5-azauracil, 2-fluoroadenine, 6-methylaminopurine, 6-dimethylaminopurine, 2-azaadenine, 7-deazaadenine, 7-cyano-7-deazaadenine, or 8-aza-9-deazaadenine;
and pharmaceutically acceptable hydrolyzable esters, having from 1 to 12 carbon atoms, pharmaceutically acceptable hydrolyzable arylethers having from 7 to 30 carbon atoms, and pharmaceutically acceptable salts of the compounds of formulas I and II.

21. The compound of claim 20 of formula I.
22. The compound of claim 21 wherein R is hydrogen.
23. The compound of claim 22 wherein B is a pyrimidine base selected from the group consisting of 5-methylaminouracil; 5-dimethylaminouracil; 5-azauracil; 6-azauracil and S-methyl-4-thiouracil.
24. The compound of claim 22 wherein B is a pyrimidine base selected from the group consisting of 5-fluorocytosine; 5-trifluoromethylcytosine; 5-methylcytosine; 5-methylaminocytosine; 5-dimethylaminocytosine; 5-azacytosine; and 6-azacytosine.
25. The compound of claim 22 wherein B is a purine base selected from the group consisting of 2-fluoroadenine; 6-methylaminopurine; 6-dimethylaminopurine; 2-azaadenine; 7-deazaadenine; 7-cyano-7-deazaadenine; and 8-aza-9-deazaadenine.
26. The compound of claim 22 wherein B is a purine base selected from the group consisting of S-methyl-6-thioguanine; 6-methylthiopurine; 8-azaguanine; 6-mercaptopurine and hypoxanthine.
27. The compound of claim 20 of formula II.
28. The compound of claim 27 wherein R is hydrogen.
29. The compound of claim 28 wherein B is a purine base selected from the group consisting of fluoroadenine; 6-methylaminopurine; 6-dimethylaminopurine; 2-azaadenine; 7-deazaadenine; 7-cyano-7-deazaadenine; and 8-aza-9-deazaadenine.

* * * * *